(12) United States Patent
Fernandes, Jr.

(10) Patent No.: US 8,679,415 B2
(45) Date of Patent: Mar. 25, 2014

(54) VARIABLE BASIS WEIGHT MOUNTING MAT OR PRE-FORM AND EXHAUST GAS TREATMENT DEVICE

(75) Inventor: Sergio David Fernandes, Jr., Getzville, NY (US)

(73) Assignee: Unifrax I LLC, Tonawanda, NY (US)

( * ) Notice: Subject to any disclaimer, the term of this patent is extended or adjusted under 35 U.S.C. 154(b) by 234 days.

(21) Appl. No.: 12/853,877

(22) Filed: Aug. 10, 2010

(65) Prior Publication Data
US 2011/0033343 A1 Feb. 10, 2011

Related U.S. Application Data

(60) Provisional application No. 61/232,596, filed on Aug. 10, 2009.

(51) Int. Cl.
*B01D 50/00* (2006.01)
(52) U.S. Cl.
USPC ........................................................ 422/179
(58) Field of Classification Search
USPC ................................................ 422/179, 180
See application file for complete search history.

(56) References Cited

U.S. PATENT DOCUMENTS

| | | | |
|---|---|---|---|
| 3,012,923 A | 12/1961 | Slayter | |
| 3,224,927 A | 12/1965 | Brown et al. | |
| 3,510,394 A | 5/1970 | Cadotte | |
| 3,649,406 A | 3/1972 | McNish | |
| 3,674,621 A | 7/1972 | Miyamoto | |
| 3,771,967 A | 11/1973 | Nowak | |
| 3,798,006 A | 3/1974 | Balluff | |
| 3,916,057 A | 10/1975 | Hatch et al. | |
| 3,957,573 A | 5/1976 | Miyamoto et al. | |
| 3,996,145 A | 12/1976 | Hepburn | |
| 4,007,539 A | 2/1977 | Nishio | |
| 4,011,651 A | 3/1977 | Bradbury et al. | |
| 4,048,363 A | 9/1977 | Langer et al. | |

(Continued)

FOREIGN PATENT DOCUMENTS

| | | |
|---|---|---|
| DE | 3925845 | 2/1991 |
| DE | 42 20 988 A1 | 4/1994 |

(Continued)

OTHER PUBLICATIONS

International Search Report, Form PCT/ISA/210 mailed Apr. 28, 2011 for PCT International Patent Application No. PCT/US2010/002197.

(Continued)

*Primary Examiner* — Tom Duong
(74) *Attorney, Agent, or Firm* — Curatolo Sidoti Co., LPA; Joseph G. Curatolo; Salvatore A. Sidoti (57) ABSTRACT

An exhaust gas treatment device includes a housing, a fragile element disposed within the housing, and a mounting mat disposed between the fragile element and the housing for maintaining the positioning of the fragile element, absorbing mechanical shock, and providing thermal insulation. The mounting mat includes a layer or sheet of inorganic fibers with a portion of the layer having a first basis weight and another portion having a second basis weight that is different from the first basis weight. The mat or a vacuum formed insulating pre-form having a variable basis weight in certain regions may be used as end cone insulation in exhaust gas treatment devices.

16 Claims, 7 Drawing Sheets

(56) References Cited

U.S. PATENT DOCUMENTS

| | | | |
|---|---|---|---|
| 4,093,423 A | 6/1978 | Neumann | |
| 4,101,280 A | 7/1978 | Frietzsche et al. | |
| 4,142,864 A | 3/1979 | Rosynsky et al. | |
| 4,156,533 A | 5/1979 | Close et al. | |
| 4,204,907 A | 5/1980 | Korklan et al. | |
| 4,239,733 A | 12/1980 | Foster et al. | |
| 4,269,807 A | 5/1981 | Bailey et al. | |
| 4,269,887 A | 5/1981 | Sonobe et al. | |
| 4,271,228 A | 6/1981 | Foster et al. | |
| 4,279,864 A | 7/1981 | Nara et al. | |
| 4,305,992 A | 12/1981 | Langer et al. | |
| 4,328,187 A | 5/1982 | Musall et al. | |
| 4,332,852 A | 6/1982 | Korklan et al. | |
| 4,335,077 A | 6/1982 | Santiago et al. | |
| 4,353,872 A | 10/1982 | Midorikawa | |
| 4,385,135 A | 5/1983 | Langer et al. | |
| 4,447,345 A | 5/1984 | Kummermehr et al. | |
| 4,617,176 A | 10/1986 | Merry | |
| 4,693,338 A | 9/1987 | Clerc | |
| 4,698,213 A | 10/1987 | Shimozi et al. | |
| 4,735,757 A | 4/1988 | Yamamoto et al. | |
| 4,746,570 A | 5/1988 | Suzaki et al. | |
| 4,752,515 A | 6/1988 | Hosoi et al. | |
| 4,797,263 A | 1/1989 | Oza | |
| 4,823,845 A | 4/1989 | Martin et al. | |
| 4,849,382 A | 7/1989 | Shibata et al. | |
| 4,863,700 A | 9/1989 | Ten Eyck | |
| 4,865,818 A | 9/1989 | Merry et al. | |
| 4,927,608 A | 5/1990 | Wörner et al. | |
| 4,929,429 A | 5/1990 | Merry | |
| 4,985,212 A | 1/1991 | Kawakami et al. | |
| 4,999,168 A | 3/1991 | Ten Eyck | |
| 5,002,836 A | 3/1991 | Dinwoodie et al. | |
| 5,008,086 A | 4/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,139,615 A | 8/1992 | Conner et al. | |
| 5,145,811 A | 9/1992 | Lintz et al. | |
| 5,151,253 A | 9/1992 | Merry et al. | |
| 5,167,765 A | 12/1992 | Nielsen et al. | |
| 5,242,871 A | 9/1993 | Hashimoto et al. | |
| 5,250,269 A | 10/1993 | Langer | |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,332,699 A | 7/1994 | Olds et al. | |
| 5,340,643 A | 8/1994 | Ou et al. | |
| 5,346,868 A | 9/1994 | Eschner | |
| 5,376,341 A | 12/1994 | Gulati | |
| 5,380,580 A | 1/1995 | Rogers et al. | |
| 5,384,188 A | 1/1995 | Lebold et al. | |
| 5,389,716 A | 2/1995 | Graves | |
| 5,419,975 A | 5/1995 | Lintz et al. | |
| 5,453,116 A | 9/1995 | Fischer et al. | |
| 5,482,686 A | 1/1996 | Lebold et al. | |
| 5,488,826 A | 2/1996 | Paas | |
| 5,502,937 A | 4/1996 | Wilson | |
| 5,523,059 A | 6/1996 | Langer | |
| 5,567,536 A | 10/1996 | Lintz et al. | |
| 5,580,532 A | 12/1996 | Robinson et al. | |
| 5,585,312 A | 12/1996 | Ten Eyck et al. | |
| 5,666,726 A | 9/1997 | Robinson et al. | |
| 5,714,421 A | 2/1998 | Olds et al. | |
| 5,736,109 A | 4/1998 | Howorth et al. | |
| 5,811,063 A | 9/1998 | Robinson et al. | |
| 5,811,360 A | 9/1998 | Jubb | |
| 5,821,183 A | 10/1998 | Jubb | |
| 5,853,675 A | 12/1998 | Howorth | |
| 5,862,590 A | 1/1999 | Sakashita et al. | |
| 5,869,010 A | 2/1999 | Langer | |
| 5,874,375 A | 2/1999 | Zoitos et al. | |
| 5,882,608 A | 3/1999 | Sanocki et al. | |
| 5,928,075 A | 7/1999 | Miya et al. | |
| 5,928,975 A | 7/1999 | Jubb | |
| 5,943,771 A | 8/1999 | Schmitt | |
| 5,955,177 A | 9/1999 | Sanocki et al. | |
| 5,955,389 A | 9/1999 | Jubb | |
| 6,000,131 A | 12/1999 | Schmitt | |
| 6,025,288 A | 2/2000 | Zoitos et al. | |
| 6,030,910 A | 2/2000 | Zoitos et al. | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,185,820 B1 | 2/2001 | Foster | |
| 6,231,818 B1 | 5/2001 | TenEyck | |
| 6,251,224 B1 | 6/2001 | Dong | |
| 6,267,843 B1 | 7/2001 | Helwig et al. | |
| 6,316,384 B1 | 11/2001 | Bruck et al. | |
| 6,317,976 B1 | 11/2001 | Aranda et al. | |
| 6,466,932 B1 | 10/2002 | Robin et al. | |
| 6,491,878 B1 | 12/2002 | Locker et al. | |
| 6,589,488 B1 | 7/2003 | Eyhorn | |
| 6,726,884 B1 | 4/2004 | Dillon et al. | |
| 6,737,146 B2 | 5/2004 | Schierz et al. | |
| 6,756,107 B1 | 6/2004 | Schierz et al. | |
| 6,855,298 B2 | 2/2005 | TenEyck | |
| 6,861,381 B1 | 3/2005 | Jubb et al. | |
| 6,923,942 B1 | 8/2005 | Shirk et al. | |
| 6,953,757 B2 | 10/2005 | Zoitos et al. | |
| 7,033,412 B2 | 4/2006 | Kumar et al. | |
| 7,153,796 B2 | 12/2006 | Jubb et al. | |
| 7,259,118 B2 | 8/2007 | Jubb et al. | |
| 7,261,864 B2 | 8/2007 | Watanabe | |
| 7,387,822 B2 | 6/2008 | Dinwoodie | |
| 7,550,118 B2 | 6/2009 | Merry | |
| 7,820,117 B2 | 10/2010 | Peisert et al. | |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0097752 A1* | 5/2003 | Shirk et al. | 29/890 |
| 2003/0185724 A1 | 10/2003 | Anji et al. | |
| 2004/0022699 A1 | 2/2004 | Fukushima et al. | |
| 2004/0052694 A1 | 3/2004 | Nishikawa et al. | |
| 2004/0234436 A1 | 11/2004 | Howorth | |
| 2005/0232827 A1 | 10/2005 | Merry | |
| 2005/0232828 A1* | 10/2005 | Merry | 422/179 |
| 2005/0272602 A1 | 12/2005 | Ninomiya | |
| 2006/0070554 A1* | 4/2006 | Braunreiter et al. | 106/711 |
| 2006/0153746 A1 | 7/2006 | Merry et al. | |
| 2006/0154040 A1 | 7/2006 | Merry | |
| 2006/0278323 A1 | 12/2006 | Eguchi | |
| 2007/0065349 A1 | 3/2007 | Merry | |
| 2007/0207069 A1 | 9/2007 | Kariya et al. | |
| 2008/0178566 A1 | 7/2008 | Okabe | |
| 2008/0181831 A1 | 7/2008 | Okabe | |
| 2008/0253939 A1* | 10/2008 | Hornback | 422/168 |
| 2009/0060800 A1 | 3/2009 | Fernandez | |
| 2009/0060802 A1 | 3/2009 | Beauharnois | |
| 2009/0114907 A1 | 5/2009 | Saiki | |
| 2010/0207298 A1 | 8/2010 | Kunze et al. | |
| 2010/0209306 A1 | 8/2010 | Kunze et al. | |

FOREIGN PATENT DOCUMENTS

| | | |
|---|---|---|
| DE | 196 38 542 A1 | 3/1997 |
| DE | 199 57 692 A1 | 5/2001 |
| EP | 0 205 704 A1 | 12/1986 |
| EP | 0 279 511 A2 | 8/1988 |
| EP | 0 319 299 A2 | 6/1989 |
| EP | 0 328 293 A1 | 8/1989 |
| EP | 0 366 484 A2 | 5/1990 |
| EP | 0 396 331 A1 | 11/1990 |
| EP | 0 398 130 A2 | 11/1990 |
| EP | 0 465 203 A1 | 1/1992 |

(56) References Cited

FOREIGN PATENT DOCUMENTS

| | | |
|---|---|---|
| EP | 0 508 751 A1 | 10/1992 |
| EP | 0 551 532 A1 | 7/1993 |
| EP | 0 573 834 A1 | 12/1993 |
| EP | 0 643 204 A2 | 3/1995 |
| EP | 0 765 993 A1 | 4/1997 |
| EP | 0 803 643 A1 | 10/1997 |
| EP | 1 267 048 A1 | 12/2002 |
| EP | 1 403 478 A2 | 3/2004 |
| EP | 1 495 807 A1 | 1/2005 |
| EP | 1 533 409 A1 | 5/2005 |
| EP | 1 696 110 A1 | 8/2006 |
| EP | 1 830 043 A1 | 9/2007 |
| EP | 1 905 895 A1 | 4/2008 |
| EP | 1 931 862 A1 | 6/2008 |
| EP | 1 950 035 A1 | 7/2008 |
| EP | 2 058 425 A1 | 5/2009 |
| GB | 1 438 762 A | 6/1976 |
| GB | 1 438 784 A | 6/1976 |
| GB | 1 513 808 A | 6/1978 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 4-083773 | 3/1992 |
| JP | 06-033755 A | 2/1994 |
| JP | 6-272549 | 9/1994 |
| JP | 7-286514 | 10/1995 |
| JP | 09-164337 | 6/1997 |
| JP | 2002-147231 A | 5/2002 |
| JP | 2005-282374 A | 10/2005 |
| JP | 2006/177368 A | 7/2006 |
| JP | 2007-532825 A | 11/2007 |
| JP | 2008-201125 A | 9/2008 |
| JP | 2008-201126 A | 9/2008 |
| JP | 2009-511819 A | 3/2009 |
| WO | WO 91/11498 A1 | 8/1991 |
| WO | WO 93/23245 | 11/1993 |
| WO | WO 94/24425 | 10/1994 |
| WO | WO 97/02413 | 1/1997 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2005/106222 | 11/2005 |
| WO | WO 2006/065534 | 6/2006 |
| WO | WO 2007/044485 A1 | 4/2007 |
| WO | WO 2007/143437 | 12/2007 |
| WO | WO 2008/103525 A2 | 8/2008 |
| WO | WO 2008/154078 A1 | 12/2008 |
| WO | WO 2008/156942 A1 | 12/2008 |

OTHER PUBLICATIONS

Written Opinion, Form PCT/ISA/237 mailed Apr. 28, 2011 for PCT International Patent Application No. PCT/US2010/002197.
Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
Maret, Gulati, Lambert & Zink. Systems Durability of a Ceramic Racetrack Converter. International Fuels and Lubricants Meeting, Toronto, Canada, Oct. 7-10, 1991.
English language abstract of DE 19858025; Publication Date: Jun. 21, 2000; Applicant: Aslgawo GmbH.
Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
Japanese Office Action, mailed Jul. 31, 2013, for corresponding Japanese Patent Application No. 2012-524694.
Supplemental European Search Report and Opinion, mailed Sep. 26, 2013, for corresponding European Patent Application No. 10808443.5.

* cited by examiner

VARIABLE BASIS WEIGHT MOUNTING MAT OR PRE-FORM AND EXHAUST GAS TREATMENT DEVICE

The present application claims the benefit of the filing date, under 35 U.S.C. §119(e), from U.S. Provisional Application Ser. No. 61/232,596, filed Aug. 10, 2009, which is hereby incorporated by reference.

TECHNICAL FIELD

Disclosed is a mat or molded pre-form for use in an exhaust gas treatment device, such as catalytic converters and diesel particulate traps that are used in automotive exhaust systems. The mat may be used as a mounting mat to mount a fragile monolith within a housing of an exhaust gas treatment device or as thermal insulation in an end cone of the exhaust gas treatment device. A selected portion of the mat or end cone pre-form has an area of basis weight that is greater than other areas of the mat or pre-form.

BACKGROUND

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The fragile catalyst support structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

Exhaust gas treatment devices typically comprise an end cone region between the fragile catalyst support structure or fragile particulate filter or trap and the exhaust pipe. According to certain embodiments, the end cone for an exhaust gas treatment device comprises an outer metallic cone; an inner metallic cone; and cone insulation disposed between said outer and inner metallic end cones. The end cone for an exhaust gas treatment device may comprise an outer metallic cone and a self-supporting cone insulation disposed adjacent the inner surface of said outer metallic end cone.

Mounting mats are often subject to local differences in gap bulk density and thermal gap expansion; that is, the gap bulk density and thermal gap expansion are not constant throughout the mounting mat. These local differences can contribute to undesirable support mat erosion upon exposure to hot exhaust gases.

SUMMARY

Provided is a mat for use as a mounting mat or end cone insulation in an exhaust gas treatment device, said mat comprising a sheet of inorganic fibers, wherein said sheet comprises opposite first and second major surfaces, a length, a width and an uncompressed thickness, and wherein said sheet comprises a first portion having a first uncompressed basis weight and a second portion having a second uncompressed basis weight that is greater than the first basis weight.

Also provided is an exhaust gas treatment device comprising a housing; a fragile structure located within the housing; and a mounting mat disposed in a gap between said housing and said fragile structure, said mat comprising a sheet of inorganic fibers comprising opposite first and second major surfaces, a length, a width and an uncompressed thickness, and wherein said sheet comprises a first portion having a first uncompressed basis weight and a second portion having a second uncompressed basis weight that is greater than the first basis weight.

Additionally provided is an exhaust gas treatment device comprising a housing; a fragile structure located within the housing; and a mounting mat disposed in a gap between said housing and said fragile structure; a double walled end cone housing; and a mat or molded three dimensional insulation pre-form disposed between the walls of the double walled end cone housing, said mat or pre-form comprising inorganic fibers and a first portion having a first uncompressed basis weight and a second portion having a second uncompressed basis weight that is greater than the first basis weight.

Further provided is an end cone for an exhaust gas treatment device comprising an outer metallic cone; an inner metallic cone; and a mat or molded three dimensional insulation pre-form disposed between said outer and inner metallic end cones, said mat or pre-form comprising inorganic fibers and a first portion having a first uncompressed basis weight and a second portion having a second uncompressed basis weight that is greater than the first basis weight.

Further provided is a method of making a device for treating exhaust gases comprising wrapping a mat comprising a sheet of inorganic fibers comprising opposite first and second major surfaces, a length, a width and an uncompressed thickness, and wherein said sheet comprises a first portion having a first uncompressed basis weight and a second portion having a second uncompressed basis weight that is greater than the first basis weight around at least a portion of a fragile structure adapted for treating exhaust gases; and disposing the fragile structure and the mounting mat within a housing with the mounting mat being disposed between the fragile structure and the housing.

Further provided is a method for making an end cone for an exhaust gas treatment device, the method comprising disposing a mat or molded three dimensional insulation pre-form between the outer and inner metallic end cones, said mat or pre-form comprising inorganic fibers and a first portion having a first uncompressed basis weight and a second portion having a second uncompressed basis weight that is greater than the first basis weight.

DETAILED DESCRIPTION

Disclosed is a mat or molded (such as, for example, vacuum formed) pre-form for use in an exhaust gas treatment device, such as catalytic converters and diesel particulate traps that are used in automotive exhaust systems. The mat or pre-form may be used as a mounting mat to mount a fragile monolith within a housing of an exhaust gas treatment device or as thermal insulation in the end cone regions of the exhaust gas treatment device. A portion of the mat or pre-form has a greater basis weight than other portions of the mat or pre-form. The variation in basis weight of the mat or pre-form is believed to impart resistance to hot gas erosion during the normal operation of the exhaust gas treatment device.

According to certain embodiments, the mat comprises at least one non-intumescent sheet of inorganic fibers. The sheet comprises a length, width and uncompressed thickness. The sheet comprises a first section having a first uncompressed basis weight and at least one second section having a second uncompressed basis weight that is different than the first basis weight.

A device for treating exhaust gases is also provided. The device includes an outer metallic housing, at least one fragile structure that is mounted within the housing by a mounting mat that is disposed between the inner surface of the housing and the outer surface of the fragile structure. The mounting mat used to mount the fragile structure comprises a sheet of inorganic fibers and has a first section having a first uncompressed basis weight and a second section having a second uncompressed basis weight that is different than the first basis weight.

The term "fragile structure" is intended to mean and include structures such as metal or ceramic monoliths or the like which may be fragile or frangible in nature, and would benefit from a mounting mat such as is described herein. These structures generally include one or more porous tubular or honeycomb-like structures mounted by a thermally resistant material within a housing. Each structure includes anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for chemical industry emission (exhaust) stacks.

According to other embodiments, provided is an end cone for an exhaust gas treatment device. The end cones are of a double walled structure having an inner end cone housing and an outer end cone housing. A mat or vacuum formed insulation pre-form is disposed in the gap or space between the inner and outer end cone housings. The mat or vacuum formed pre-form has a first section having a first uncompressed basis weight and a second section having a second uncompressed basis weight that is different than the first basis weight.

According to other embodiments, the exhaust gas treatment device includes an outer metallic housing, at least one fragile structure that is mounted within the housing by a mounting mat that is disposed between the inner surface of the housing and the outer surface of the fragile structure, and end cones located at the inlet and outlet regions of the device. The end cone regions are of a double walled structure having an inner end cone housing and an outer end cone housing. A mat or vacuum formed insulation pre-form is disposed in the gap or space between the inner and outer end cone housings. The mat or vacuum formed pre-form has a first section having a first uncompressed basis weight and a second section having a second uncompressed basis weight that is different than the first basis weight.

Figure 1:
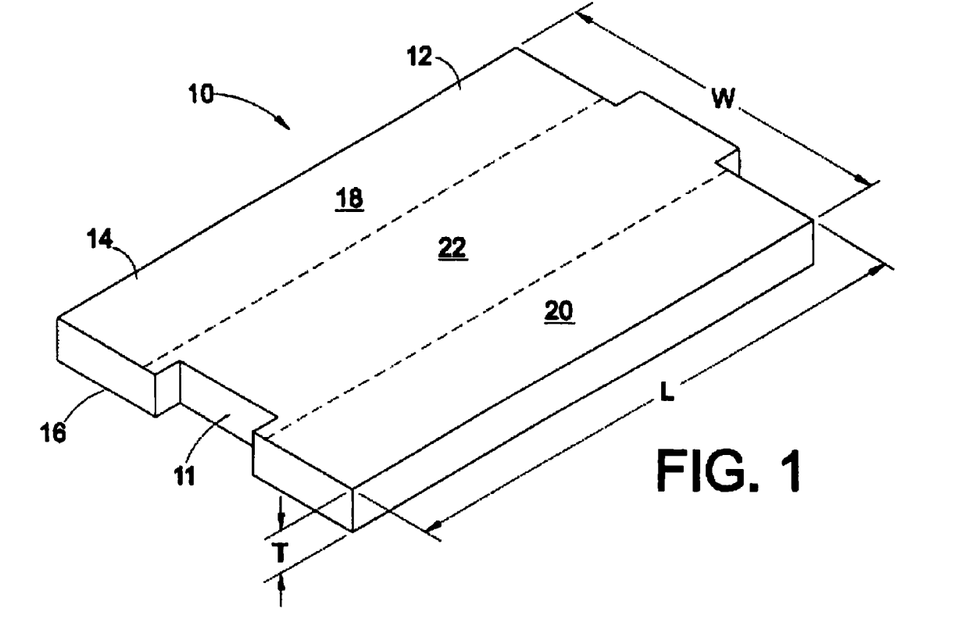
FIG. 1 is a perspective view of an illustrative variable basis weight mounting mat.

FIG. 1 shows an illustrative embodiment of a mounting mat 10 for an exhaust gas treatment device, such as an automotive catalytic converter or diesel particulate trap. Mounting mat 10 comprises a base layer or sheet 12 of flexible fibrous material. The base layer 12 of flexible fibrous material includes opposite facing first 14 and second 16 major surfaces. Base layer 12 also has a length L, a width W, and an uncompressed thickness T. Uncompressed thickness refers to the thickness of the mounting mat 10 absent any external compressive force applied to the mat. Because a mat installed between the fragile structure and the housing is compressed, the installed thickness is less than the uncompressed thickness. According to the illustrative embodiment shown in FIG. 1 the mounting mat 10 is shown having a tongue 9 at one end and a mating groove 11 at the opposite end. The tongue 9 mates with the groove 11 when the mounting mat 10 is wrapped about the outer periphery of a cylindrical fragile monolith.

Base layer 12 of mounting mat 10 also has opposite lateral areas 18 and 20. At least one of the lateral areas 18, 20 of base layer 12 of mounting mat 10 has a basis weight that is greater than the basis weight of the remainder of the base layer 12. According to certain illustrative embodiments, either of lateral areas 18 or 20 of base layer 12 may have a basis weight that is greater than the remainder of the base layer 12. According to other illustrative embodiments, both lateral areas 18 and 20 have a basis weight that is greater than the basis weight of area 22 of the mounting mat 10 which extends between lateral mat areas 18 and 20. The basis weight of lateral areas 18 and 20 may be the same or different.

The variable basis weights may be achieved by joining a distinct piece of material 24 to one or both of the lateral surface areas 18 and/or 20 on one or both of opposite facing first 14 and second major surfaces of the base layer 12. Alternatively, the variable basis weights may be achieved by joining a distinct piece of material 24 to lateral surface area 18 on one of the first 14 and second 16 major surfaces of the base layer 12 and a distinct piece of material 24 to lateral surface area 20 on the opposite facing major surface.

Figure 2A:
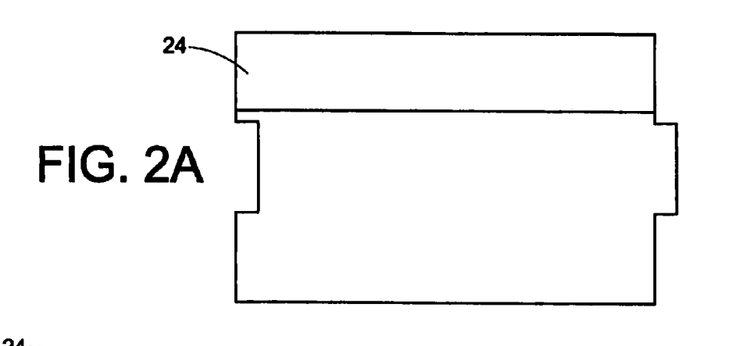
FIG. 2A is an overhead view of an illustrative variable basis weight mounting mat.
Figure 2B:
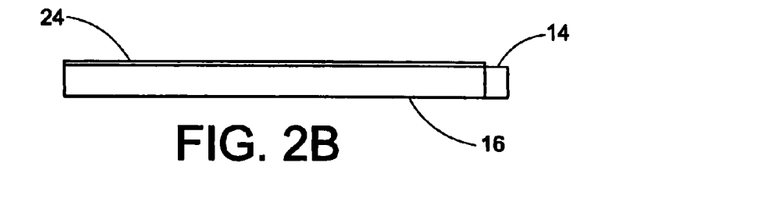
FIG. 2B is a side view of an illustrative variable basis weight mounting mat.

Referring now to FIGS. 2A and 2B, the variable basis weights may be achieved by joining a distinct piece of material 24 to one of the lateral surface areas 18 or 20 on one of opposite facing first 14 and second 16 major surfaces of the base layer 12. The uncompressed thickness of the resulting product has an uncompressed thickness of the base layer 12 plus that of the uncompressed thickness of the additive fibrous material 24 in desired regions in which additive material 24 has been joined to the base layer 12. In other regions of the base layer 12 of the mounting mat 10, such as portion 22 extending between the opposite lateral areas 18 and 20, the uncompressed thickness of the mounting mat 10 comprises only the uncompressed thickness of the base layer 12.

One or more pieces 24 of distinct material may be joined to the surface or surfaces of the base layer 12 to build up the basis weight in a desired area of the mat. Moreover, distinct pieces of material 24 can be attached to the base layer 12 or to other distinct pieces of material 24. By attachment of subsequent distinct pieces of material 24 to previously attached pieces of material 24, a support mat 10 of complex uncompressed thicknesses may be created. The distinct pieces of material 24 may be attached to the base layer 12 or to other distinct pieces of material 24 by means such as pressing, hot pressing, needling, gluing, stapling, stitching, threading or combinations thereof. As used herein "pressing" is distinct from the compression that the material is subject to in its installed state.

Figure 2C:
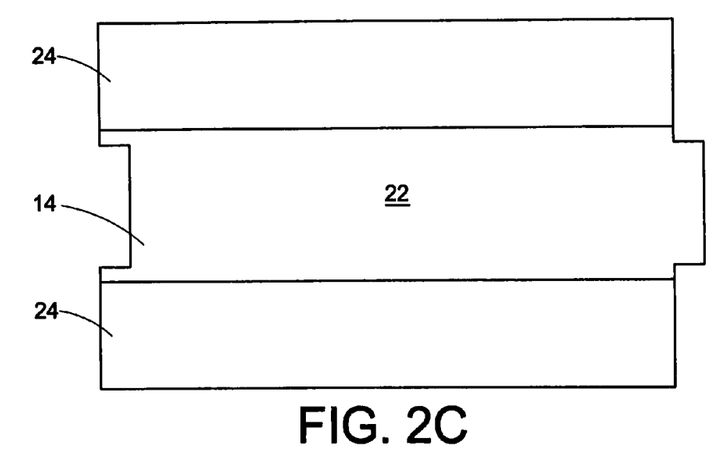
FIG. 2C is an overhead view of an illustrative variable basis weight mounting mat.

Turning to FIG. 2C, the variable basis weights may be achieved by joining a distinct piece of material 24 to both of the lateral surface areas 18 and 20 on one of opposite facing first 14 and second 16 major surfaces of the base layer 12. The uncompressed thickness of the resulting product has an uncompressed thickness of the base layer 12 plus that of the uncompressed thickness of the distinct piece of material 24 in desired regions in which a distinct piece of material 24 has been joined to the base layer 12. In other regions of the base layer 12 of the mounting mat 10, such as the portion 22 extending between the opposite lateral areas 18 and 20, the uncompressed thickness of the mounting mat 10 comprises only the uncompressed thickness of the base layer 12.

Figure 2D:
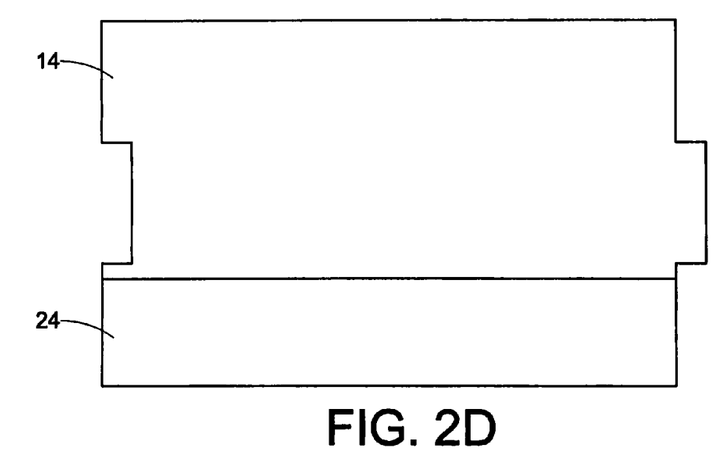
FIG. 2D is an overhead view of an illustrative variable basis weight mounting mat.
Figure 2E:
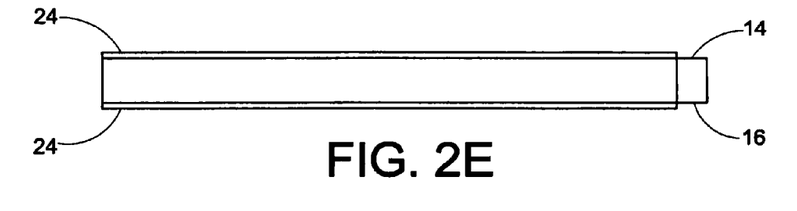
FIG. 2E is a side view of an illustrative variable basis weight mounting mat.

Turning to FIGS. 2D and 2E, the variable basis weights may be achieved by joining a distinct piece of material 24 to one of the lateral surface areas 18 or 20 on both of the first 14 and second 16 opposite facing major surfaces of the base layer 12. The uncompressed thickness of the resulting product has an uncompressed thickness of the base layer 12 plus that of the uncompressed thickness of the distinct piece of material 24 in desired regions in which a distinct piece of material 24 has been joined to the base layer 12. In other regions of the base layer 12 of the mounting mat 10, such as the portion 22 extending between the opposite lateral surface areas 18 and 20, the uncompressed thickness of the mounting mat 10 comprises only the uncompressed thickness of the base layer 12.

Figure 2F:
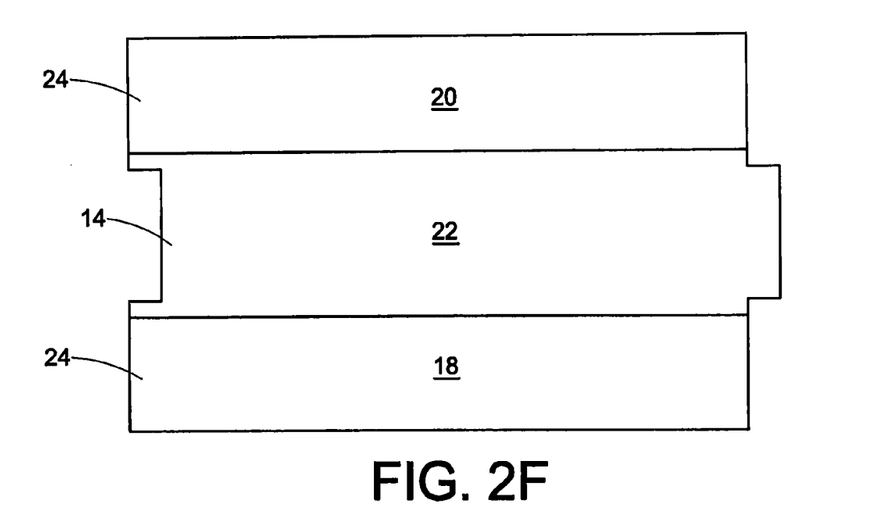
FIG. 2F is an overhead view of an illustrative variable basis weight mounting mat.
Figure 2G:
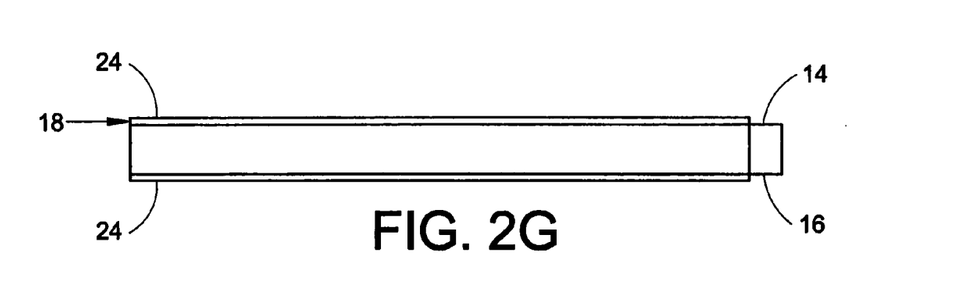
FIG. 2G is a side view of an illustrative variable basis weight mounting mat.
Figure 2H:
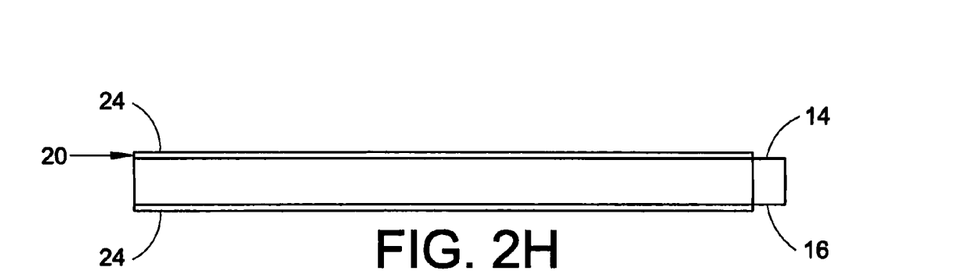
FIG. 2H is a side view of an illustrative variable basis weight mounting mat.

Turning to FIG. 2F through 2H, the variable basis weights may be achieved by joining a distinct piece of material 24 to both of the lateral surface areas 18 and 20 on both of the first 14 and second 16 opposite facing major surfaces of the base layer 12. The uncompressed thickness of the resulting product has an uncompressed thickness of the base layer 12 plus that of the uncompressed thickness of the distinct piece of material 24 in lateral areas 18 and 20 where material 24 is has been joined to the base layer 12. In other regions of the base layer 12 of the mounting mat 10, such as the portion 22 extending between the opposite lateral areas 18 and 20, the uncompressed thickness of the mounting mat 10 comprises only the uncompressed thickness of the base layer 12.

Figure 3:
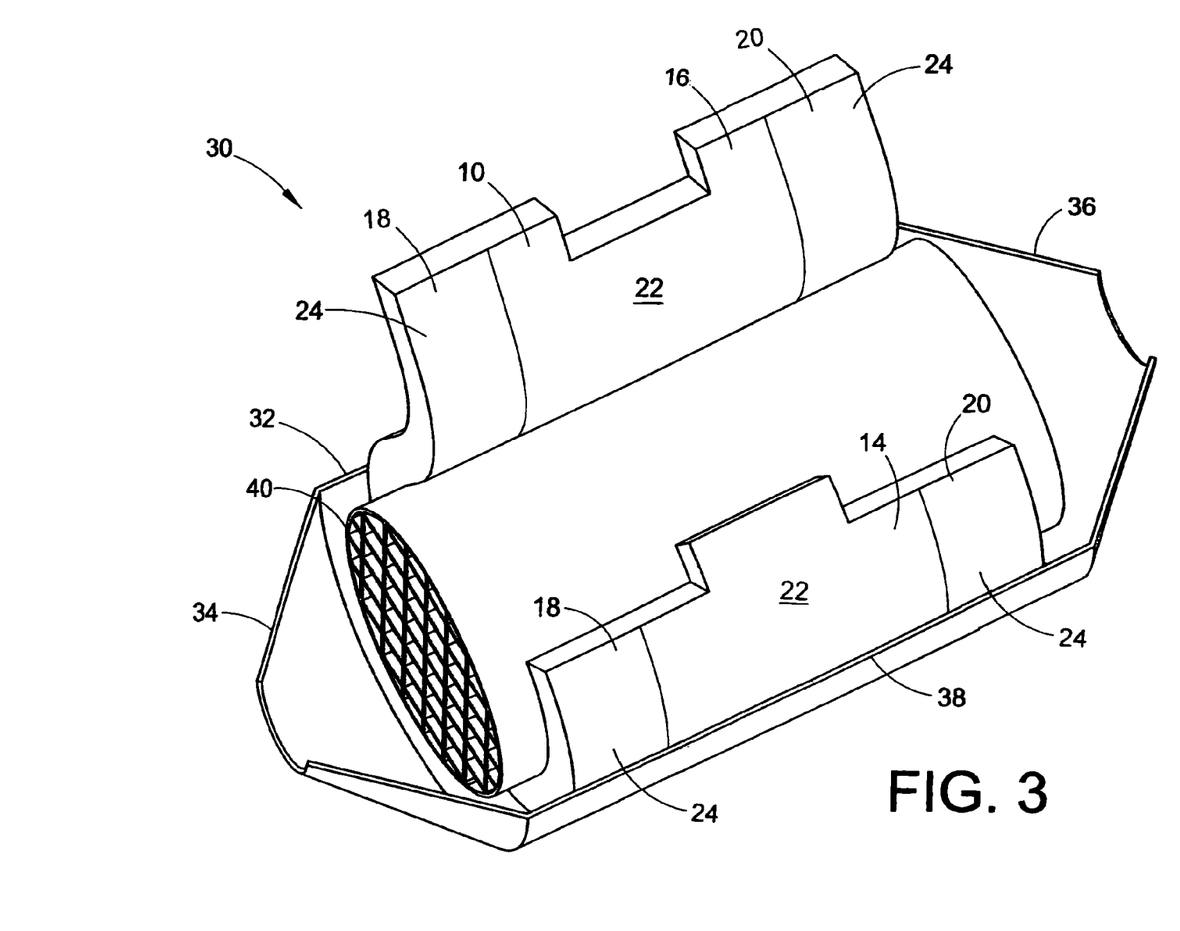
FIG. 3 is a perspective and cross-sectional view of an exhaust gas treatment device showing an illustrative variable basis weight mounting mat wrapped around a fragile structure.

An illustrative form of a device for treating exhaust gases is a catalytic converter designated by numeral 30 in FIG. 3. It should be understood that the mounting mat is not intended to be limited to use in the device shown in FIG. 3, and so the shape is shown only as an illustrative embodiment. In fact, the mounting mat could be used to mount or support any fragile structure suitable for treating exhaust emissions and gases, such as a diesel catalyst structure, a diesel particulate trap, or the like.

Catalytic converter 30 comprises an outer metallic housing 32. The housing 32 includes a generally conical shaped inlet 34 at one end and an outlet 36 at the opposite end. The inlet cone 34 and outlet cone 36 are suitably formed at their outer ends whereby they may be secured to conduits in the exhaust system of an internal combustion engine. The housing 32 of the catalytic converter 30 includes a portion 38 extending between inlet cone 34 and outlet cone 36 for holding the a fragile catalyst support element.

Exhaust gas treatment device 30 includes a fragile structure, such as a frangible ceramic monolith 40, which is supported and restrained within housing 32 by a mounting mat 10. Monolith 40 includes a plurality of gas pervious passages that extend axially from its inlet end surface at one end to its outlet end surface at its opposite end. Monolith 40 may be constructed of any suitable refractory metal or ceramic material in any known manner and configuration. Monoliths are typically oval or round in cross-sectional configuration, but other shapes are possible.

The monolith 40 is spaced from inner surfaces of the housing 32 by a distance or a gap, which will vary according to the type and design of the device utilized, for example, a catalytic converter, a diesel catalyst structure, or a diesel particulate trap. This gap is filled with a mounting mat 10 to provide resilient support to the ceramic monolith 40. The resilient mounting mat 10 provides both thermal insulation to the external environment and mechanical support to the fragile structure, thereby protecting the fragile structure from mechanical shock across a wide range of exhaust gas treatment device operating temperatures. The mounting mat 10 may be of any of the illustrative constructions shown in FIGS. 2A-2H. In the embodiment shown in FIG. 3, mounting mat 10 includes spaced apart pieces of additive material 24 that have been joined to base layer 12 on both opposite lateral areas 18, 20 on both opposite facing surfaces 14 and 16. Alternatively, the variable basis weight mat may be formed through die stamping to provide an integral (i.e., one piece) mat having portions of differing basis weight integrated into the mat. This may be accomplished by incorporating differing weights of pre-formed fiber material into certain areas of the die prior to stamping.

Figures 4A, 4B, 4C:
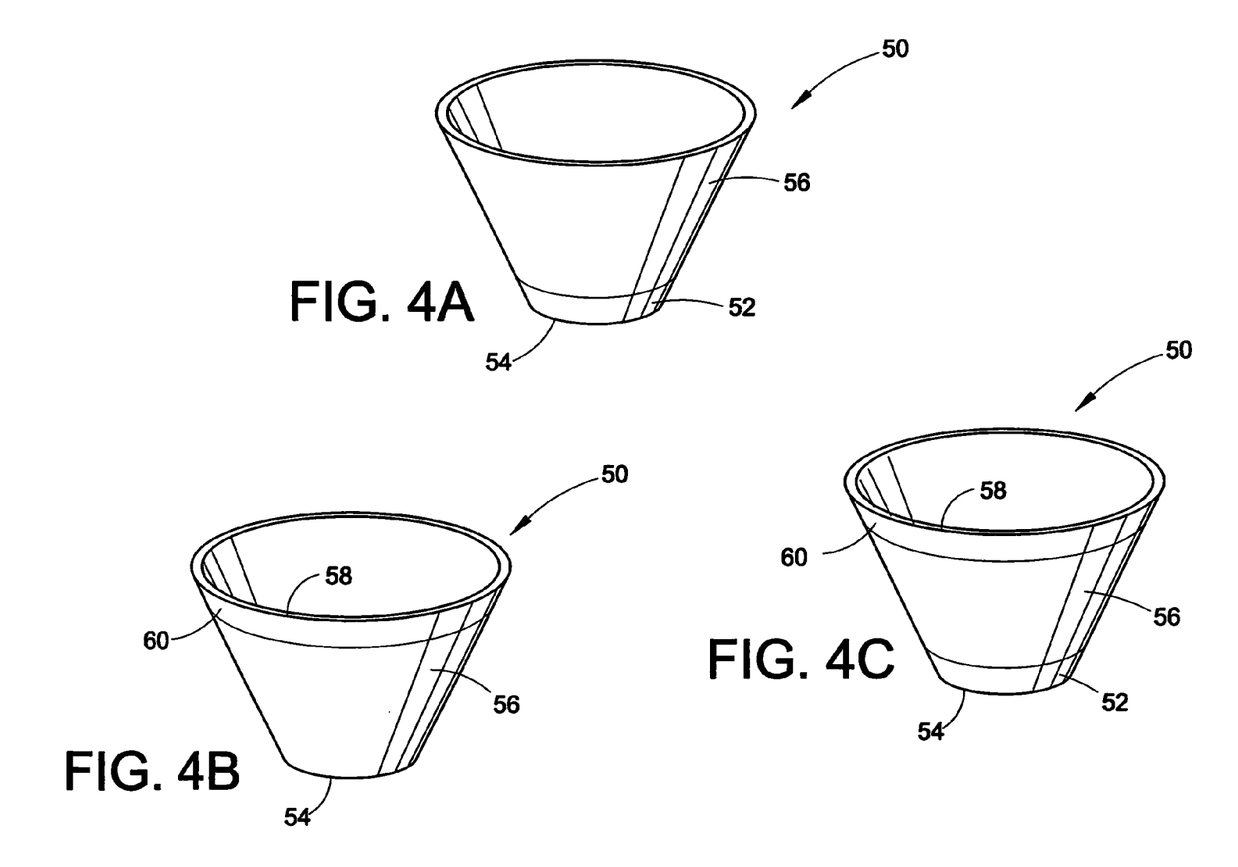
FIG. 4A is a side view of an illustrative variable basis weight end cone insulation mat.
FIG. 4B is a side view of an illustrative variable basis weight end cone insulation mat.
FIG. 4C is a side view of an illustrative variable basis weight end cone insulation mat.

Now referring to FIG. 4A through 4C, there is shown a frustoconical shaped vacuum formed insulating pre-form 50 that is useful as end cone insulation in exhaust gas treatment devices. According to the embodiment shown in FIG. 4A, end cone pre-form insulation includes additive material 52, such as a piece or strip of flexible additive fibrous material, that is joined to the cone insulation 50 near the narrow edge 54 of the pre-form 50. According to this embodiment, the end cone insulation has a variable basis weight where the basis weight of the cone at the area having the strip material 54 added is greater than the basis weight of the remaining portion of the end cone 56.

Referring to FIG. 4B, there is shown a frustoconical shaped vacuum formed insulating pre-form 50 that is useful as end cone insulation in exhaust gas treatment devices. According to the embodiment shown in FIG. 4B, end cone pre-form insulation includes a strip of additive material 60 that is joined to the cone insulation 50 near the wider edge 58 of the pre-form 50. According to this embodiment, the end cone insulation has a variable basis weight where the basis weight of the cone at the area having the strip material 60 added is greater than the basis weight of the remaining portion of the end cone 56.

Referring to FIG. 4C, there is shown a frustoconical shaped vacuum formed insulating pre-form 50 that is useful as end cone insulation in exhaust gas treatment devices. According to the embodiment shown in FIG. 4C, end cone pre-form insulation includes a strip of additive material 52 that is joined to the cone insulation 50 near the narrow edge 54 of the pre-form 50 and a strip of additive material 60 that is joined to the cone 50 along edge 58. According to this embodiment, the end cone insulation has a variable basis weight where the basis weight of the cone at areas where the additive strip material 54 and 60 is added is greater than the basis weight of the remaining portion of the end cone 56.

Figure 5A:
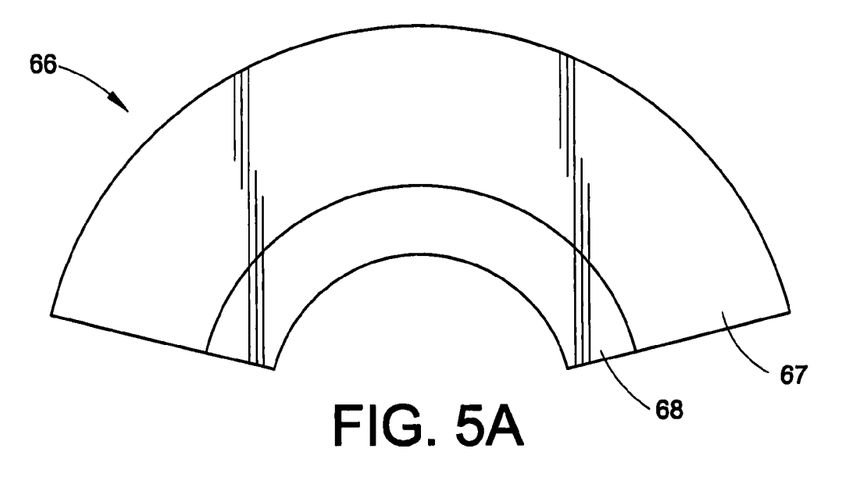
FIG. 5A is a top view of an illustrative variable basis weight sheet which may be used as an end cone insulation mat.
Figure 5B:
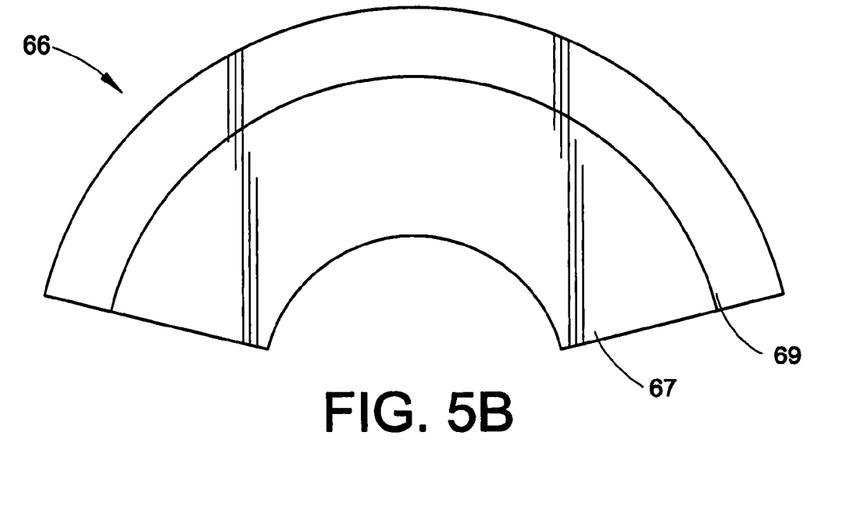
FIG. 5B is a top view of an illustrative variable basis weight sheet which may be used as an end cone insulation mat.

FIGS. 5A and 5B show sheets 66 of end cone insulation. Sheets 66 are cut or stamped into a substantially crescent shape. According to FIG. 5A, sheet 66 includes base layer 67 of inorganic fibrous insulation. A non-intumescent strip of additive material 68 or 69 is joined to one lateral area of the base layer 67 to provide a differential basis weight as compared to the basis weight of the remainder of base layer 67. It is also possible to provide increased basis weight in more than one area of the cones insulation by adding both strips 68 and 69 to the base layer 67.

Figure 6:
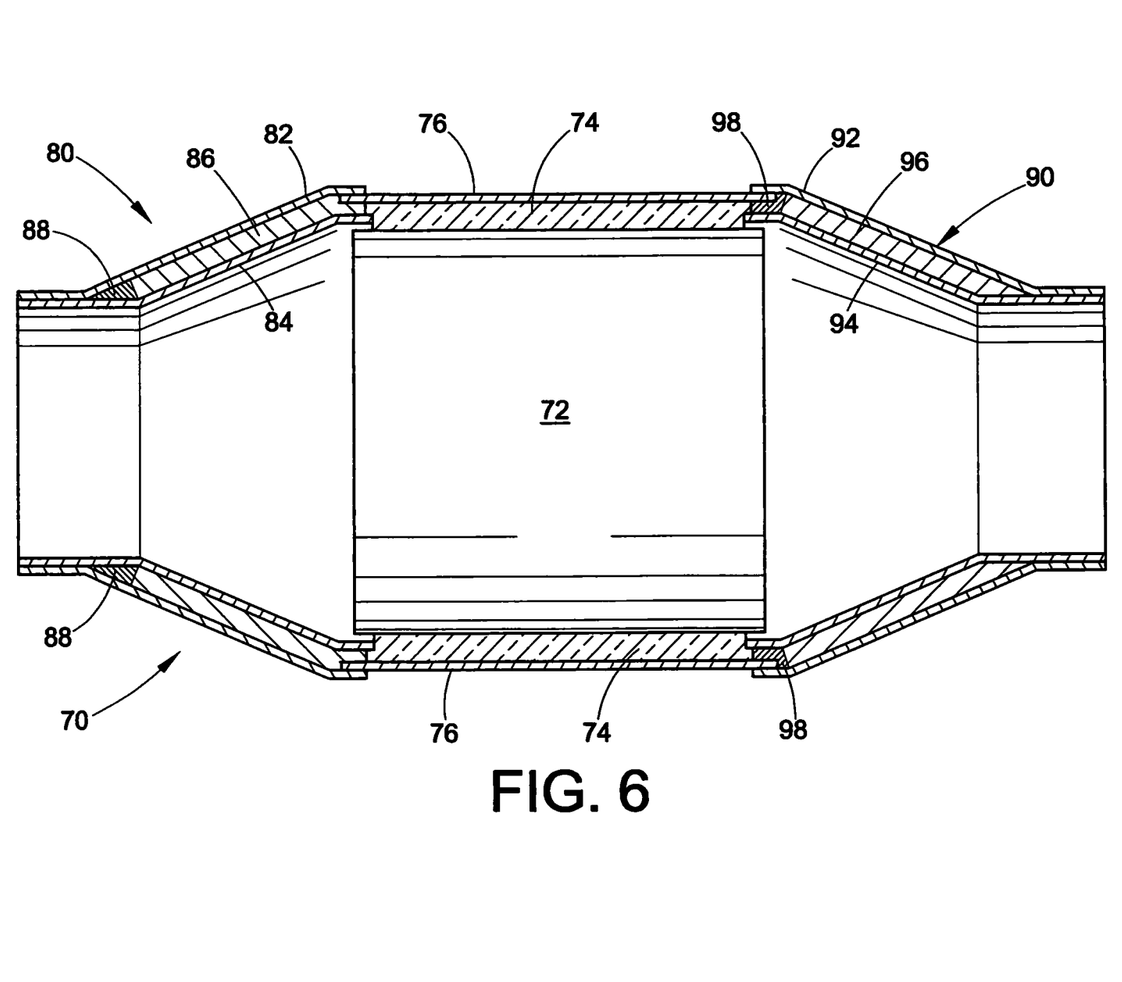
FIG. 6 is a cross-sectional view of an illustrative exhaust gas treatment device in the form of a catalytic converter.

FIG. 6 shows an exhaust gas treatment device in the form of a catalytic converter 70. Catalytic converter 70 includes middle housing portion 76. Held within middle housing portion 76 by mounting mat 74 is a fragile support element 72. Converter 70 includes an inlet cone 80 and an outlet cone 90 flanking middle portion 76. Inlet cone 80 includes outer metal housing 82 and inner metal housing 84. Positioned between outer 82 and inner 84 housing is end cone insulation 86. End cone insulation 86 includes a variable basis weight mat or perform. In the embodiment shown, additive material 88 is joined at the narrow end of the cone. Outlet cone 90 includes outer metal housing 92 and inner metal housing 94. Positioned between outer 92 and inner 94 housing is end cone insulation 96. End cone insulation 96 includes a variable basis weight mat or perform. In the embodiment shown, additive material 98 is joined at the wider edge of the cone.

Any heat resistant inorganic fibers may be utilized in the mounting mat or pre-form so long as the fibers can withstand the mounting mat or pre-form forming process, can withstand the operating temperatures of the exhaust gas treatment devices, and provide the desired minimum holding pressure performance for holding fragile structure within the exhaust gas treatment device housing at the operating temperatures of the exhaust gas treatment device, or insulating function of end cone insulation. Without limitation, suitable inorganic fibers that may be used to prepare the mounting mat and exhaust gas treatment device include high alumina polycrystalline fibers, refractory ceramic fibers such as alumino-silicate fibers, alumina-magnesia-silica fibers, kaolin fibers, alkaline earth silicate fibers such as calcia-magnesia-silica fibers and magnesia-silica fibers, S-glass fibers, S2-glass fibers, E-glass fibers, quartz fibers, silica fibers and combinations thereof.

According to certain embodiments, the heat resistant inorganic fibers that are used to prepare the mounting mat comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the registered trademark FIBERFRAX. The FIBERFRAX ceramic fibers comprise the fiberization product of about 45 to about 75 weight percent alumina and about 25 to about 55 weight percent silica. The FIBERFRAX fibers exhibit operating temperatures of up to about 1540° C. and a melting point up to about 1870° C. The FIBERFRAX fibers easily formed into high temperature resistant sheets and papers.

The alumina/silica fiber may comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weigh percent $Al_2O_3$, 7 weight percent $B_2O_3$, 3 weight percent MgO, 19 weight percent CaO and traces of the above mentioned materials.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607, SUPERWOOL 607 MAX and SUPERWOOL HT. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL HT fiber comprise about 74 weight percent silica, about 24 weight percent calcia and trace amounts of magnesia, alumina and iron oxide.

Suitable silica fibers use in the production of a mounting mat for an exhaust gas treatment device include those leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

The intumescent material that may be incorporated into the mounting mat or pre-form includes, without limitation, unexpanded vermiculite, ion-exchanged vermiculite, vermiculite, expandable graphite, hydrobiotite, water-swelling tetrasilicic flourine mica, alkaline metal silicates, or mixtures thereof, which means that the mounting mat or pre-form may include a mixture of more than on type of intumescent material. The intumescent material may comprise a mixture of unexpanded vermiculite and expandable graphite in a relative amount of about 9:1 to about 1:2 vermiculite:graphite, as described in U.S. Pat. No. 5,384,188.

The mounting mat or pre-form also includes a binder or mixture of more than one type of binder. Suitable binders include organic binders, inorganic binders and mixtures of these two types of binders. The binder used in the mounting mat is typically an organic binder which may be sacrificial in nature. By "sacrificial" is meant that the binder will eventually be burned out of the mounting mat, leaving only the fibers as the final mounting mat. Suitable binders include aqueous and nonaqueous binders, but often the binder utilized is a reactive, thermally setting latex which after cure is a flexible material that can be burned out of the installed mounting mat as indicated above.

According to certain embodiments, the mounting mat or pre-form, includes one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth) acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters. Solvents for the binders can include water, or a suitable organic solvent, such as acetone, for the binder utilized.

The organic binder may be included in the mounting mat or pre-form in an amount of greater than 0 to about 20 weight percent, from about 0.5 to about 15 weight percent, from about 1 to about 10 weight percent and from about 2 to about 8 weight percent, based on the total weight of the mounting mat or pre-form.

The mounting mat or pre-form may include polymeric binder fibers instead of, or in addition to, a resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

The molded end cone insulation may be formed by initially preparing an aqueous slurry containing the inorganic fibers. Organic binders can be included in the aqueous slurry composition in addition to the inorganic fibers. Organic binders tend to improve the integrity, flexibility, and the handling characteristics of molded three-dimensional insulator. Insulation material that is more flexible may be easier to position between the inner and outer end cone housings of a pollution control device. Suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrile lattices, and lattices of acrylate and methacrylate polymers or copolymers). The solvent-based polymeric binder materials can include a polymer such as an acrylic, a polyurethane, a vinyl acetate, a cellulose, or a rubber based organic polymer. The solvent free polymers can include natural rubber, styrene-butadiene rubber, and other elastomers.

The aqueous slurry can include an inorganic colloidal material. The inorganic colloidal material may comprise colloidal silica, colloidal alumina, colloidal zirconia, or combinations thereof. The inorganic colloidal material may be present alone or in combination with one or more organic binders.

Any suitable type of molding technique or mold known in the art can be used to prepare a preform. In some applications, the molded three-dimensional end cone insulation preform can be prepared using a vacuum forming technique. A slurry of fibers, organic binder or inorganic colloidal material (or both), and water is prepared. A permeable forming die is placed in the slurry of fibers, binder, inorganic colloidal material, water and any other desired components. A three-dimensional pre-from is vacuum formed from the slurry on the permeable forming die. The solids in the slurry can deposit on the surface of the forming die when a vacuum is drawn to form a three-dimensional pre-form cone have a substantially uniform thickness and uncompressed basis weight across the cone. The pre-form is removed from the slurry and dried. During or after drying, additive material may be joined to the molded three-dimensional cone insulation pre-form to provide a variable basis weight across the end cone insulation. Alternatively, the permeable forming die can be shaped such that when placed into the slurry, different amounts of solids from the slurry deposit on the permeable forming die in different locations to provide a monolithic three-dimensional insulating pre-form having a variable basis weight across the cone. Alternatively, different portions of the permeable forming die may be left to dwell in the slurry for a longer period of time to permit a greater build up of cone-forming material in the areas of the die as compared to areas of the die that have a shorter dwell time in the slurry of cone-forming material.

While the system has been described in connection with various embodiments, as shown in the various figures, it is to be understood that other similar embodiments may be used or modifications and additions may be made to the described embodiments for performing the same function without deviating therefrom. Furthermore, the various illustrative embodiments may be combined to produce the desired results. Therefore, the variable basis weight support mat system should not be limited to any single embodiment, but rather, should be construed in accordance with the breadth and scope of the recitation of the appended claims.

The invention claimed is:

1. A mat for use as a mounting mat or end cone insulation in an exhaust gas treatment device having a gas inlet end and a gas outlet end, the mat comprising a sheet of inorganic fibers having opposite first and second major surfaces, a length, a width and an uncompressed thickness;
   wherein the sheet comprises a first portion having a first uncompressed basis weight and a second portion having a second uncompressed basis weight that is greater than the first basis weight;
   wherein the sheet comprises a base sheet having a substantially uniform basis weight and a separate piece of sheet material joined to at least one of the first and second major surfaces of the base sheet;
   wherein at least one of the base sheet or the separate piece of sheet material is intumescent; and
   wherein the separate piece of sheet material is joined to the base sheet such that, when the sheet is installed in the exhaust gas treatment device, the sheet is positioned in the exhaust gas treatment device such that the separate piece of sheet material is proximate to the gas inlet end of the exhaust gas treatment device.

2. The mat of claim 1, wherein the mat comprises a non-intumescent sheet or an intumescent sheet.

3. The mat of claim 1, wherein the inorganic fibers are selected from the group consisting of high alumina polycrystalline fibers, ceramic fibers, mullite fibers, glass fibers, biosoluble fibers, quartz fibers, silica fibers, and combinations thereof.

4. The mat of claim 3, wherein the high alumina polycrystalline fibers comprise the fiberization product of about 72 to about 100 weight percent alumina and about 0 to about 28 weight percent silica.

5. The mat of claim 3, wherein the ceramic fibers comprise alumino-silicate fibers comprising the fiberization product of about 45 to about 72 weight percent alumina and about 28 to about 55 weight percent silica.

6. The mat of claim 3, wherein the biosoluble fibers comprise magnesia-silica fibers comprising the fiberization product of about 65 to about 86 weight percent silica, from about 14 to about 35 weight percent magnesia and about 5 weight percent or less impurities.

7. The mat of claim 3, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

8. The mat of claim 1, wherein said sheet is a cut or stamped monolithic sheet having areas of differing basis weight.

9. An exhaust gas treatment device comprising:
   a housing;
   a gas inlet end;
   a gas outlet end;
   a fragile structure located within the housing; and
   a mounting mat disposed in a gap between the housing and the fragile structure comprising:
      a sheet of inorganic fibers having opposite first and second major surfaces, a length, a width and an uncompressed thickness;
      wherein the sheet comprises a first portion having a first uncompressed basis weight and a second portion having a second uncompressed basis weight that is greater than the first basis weight;
      wherein the sheet comprises a base sheet having a substantially uniform basis weight and a separate piece of sheet material joined to at least one of the first and second major surfaces of the base sheet;
      wherein at least one of the base sheet or the separate piece of sheet material is intumescent; and
      wherein the separate piece of sheet material is joined to the base sheet such that, when the sheet is installed in the exhaust gas treatment device, the sheet is positioned in the exhaust gas treatment device such that the separate piece of sheet material is proximate to the gas inlet end of the exhaust gas treatment device.

10. The exhaust gas treatment device of claim 9, wherein the mounting mat comprises a non-intumescent sheet or an intumescent sheet.

11. The exhaust gas treatment device of claim 9, wherein the inorganic fibers are selected from the group consisting of high alumina polycrystalline fibers, ceramic fibers, mullite fibers, glass fibers, biosoluble fibers, quartz fibers, silica fibers, and combinations thereof.

12. The exhaust gas treatment device of claim 11, wherein the high alumina polycrystalline fibers comprise the fiberization product of about 72 to about 100 weight percent alumina and about 0 to about 28 weight percent silica.

13. The exhaust gas treatment device of claim 11, wherein the ceramic fibers comprise alumino-silicate fibers comprising the fiberization product of about 45 to about 72 weight percent alumina and about 28 to about 55 weight percent silica.

14. The exhaust gas treatment device of claim 11, wherein the biosoluble fibers comprise magnesia-silica fibers comprising the fiberization product of about 65 to about 86 weight percent silica, from about 14 to about 35 weight percent magnesia and about 5 weight percent or less impurities.

15. The exhaust gas treatment device of claim 11, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

16. The mat of claim 9, wherein said sheet is a cut or stamped monolithic sheet having areas of differing basis weight.

* * * * *